(12) United States Patent
O'Flarity

(10) Patent No.: US 11,525,402 B2
(45) Date of Patent: Dec. 13, 2022

(54) COMBUSTION CHAMBER WITH SOLID FUEL

(71) Applicant: United Technologies Corporation, Farmington, CT (US)

(72) Inventor: Steven M. O'Flarity, Port Saint Lucie, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 404 days.

(21) Appl. No.: 16/736,319

(22) Filed: Jan. 7, 2020

(65) Prior Publication Data

US 2021/0207538 A1   Jul. 8, 2021

(51) Int. Cl.
| | | |
|---|---|---|
| *F02C 7/22* | (2006.01) |
| *F02C 3/20* | (2006.01) |
| *F02C 3/26* | (2006.01) |
| *B64D 37/30* | (2006.01) |
| *B64D 37/34* | (2006.01) |
| *F02C 6/18* | (2006.01) |
| *B64D 27/10* | (2006.01) |

(52) U.S. Cl.
CPC ............ *F02C 7/22* (2013.01); *F02C 3/20* (2013.01); *F02C 3/26* (2013.01); *F02C 6/18* (2013.01); *B64D 27/10* (2013.01); *B64D 37/30* (2013.01); *B64D 37/34* (2013.01)

(58) Field of Classification Search
CPC ........ B64D 27/10; B64D 37/30; B64D 37/34; F02C 3/20; F02C 3/26; F02C 7/22
See application file for complete search history.

(56) References Cited

U.S. PATENT DOCUMENTS

| | | | |
|---|---|---|---|
| 4,457,136 A * | 7/1984 | Nishizaki | .............. C01B 3/0036 165/104.12 |
| 7,029,600 B2 | 10/2006 | Bushko | |
| 7,124,790 B2 | 10/2006 | Bushko | |
| 7,175,826 B2 | 2/2007 | Lemmon et al. | |
| 8,097,234 B1 | 1/2012 | Vajo et al. | |
| 9,461,323 B2 * | 10/2016 | Thampan | ................ C01B 3/001 |
| 10,214,417 B2 | 2/2019 | Halsey | |
| 10,384,937 B2 | 8/2019 | Bunker et al. | |

(Continued)

FOREIGN PATENT DOCUMENTS

GB    1509184 A    5/1978

OTHER PUBLICATIONS

European Search Report Application No. EP21150616: dated May 19, 2021; pp. 8.

(Continued)

*Primary Examiner* — Scott J Walthour

(74) *Attorney, Agent, or Firm* — Cantor Colburn LLP

(57) ABSTRACT

A propulsion system is provided and includes a solid hydride storage unit from which gaseous hydrogen fuel is drawn, an engine comprising a combustion chamber and a piping system to draw the gaseous hydrogen fuel from the solid hydride storage unit, the piping system being interposed between the solid hydride storage unit and the combustion chamber. The combustion chamber is receptive of the gaseous hydrogen fuel drawn from the solid hydride storage unit by the piping system and is configured to combust the gaseous hydrogen fuel to drive an operation of the engine.

17 Claims, 7 Drawing Sheets

(56) References Cited

U.S. PATENT DOCUMENTS

| | | | |
|---|---|---|---|
| 2004/0016769 A1* | 1/2004 | Redmond | C01B 3/0026 |
| | | | 222/3 |
| 2012/0174984 A1 | 7/2012 | Brooks et al. | |
| 2015/0064585 A1 | 3/2015 | Hyde et al. | |
| 2015/0337729 A1 | 11/2015 | Golben | |
| 2018/0178920 A1* | 6/2018 | Swann | F02K 5/00 |
| 2018/0346330 A1 | 12/2018 | Halsey et al. | |

OTHER PUBLICATIONS

Michelle Fung, "Energy Density of Hydrogen—The Physics Factbook", 2005, URL:<https://hypertextbook.com/facts/2005/MichelleFung.shtml>, 2 pages.
Rickard, "EVTV Motor Verks", 2018, 54 pages.
Roject et al., "Tesla", 2019, Tesla, inc., 25 pages.
Wright, "Tesla", 2017, Tesla, inc., 17 pages.

* cited by examiner

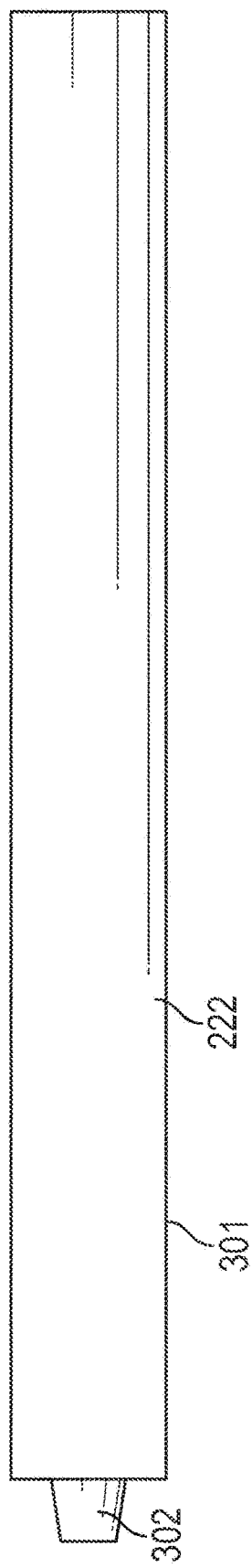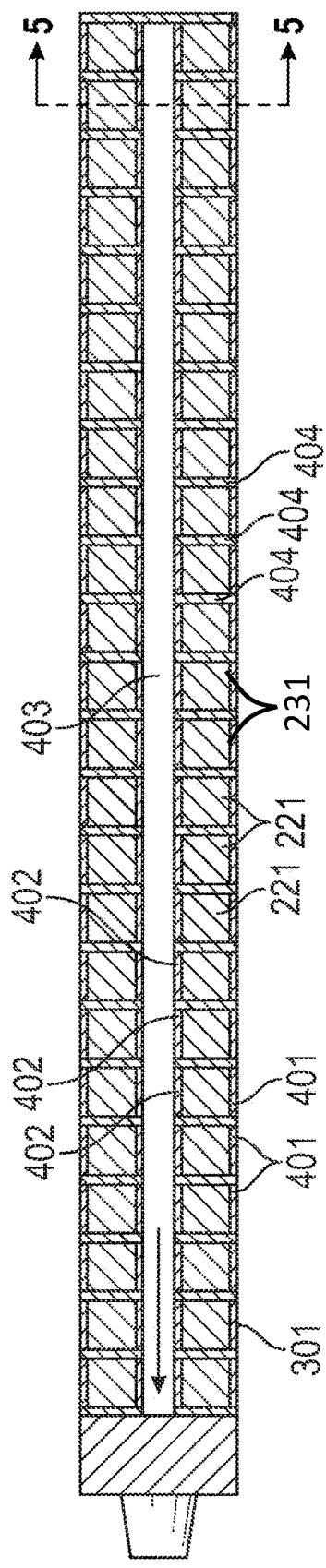

COMBUSTION CHAMBER WITH SOLID FUEL

BACKGROUND

The following description relates to combustion chamber engine systems and, more particularly, to a combustion chamber engine system that uses solid fuel.

Currently, gas turbine engines, such as those used in aircraft, burn non-renewable fossil fuel, producing greenhouse gases (GHGs) and particulate emissions that contribute to climate change. This is done, among other reasons, because gas turbine engines are typically very efficient in converting liquid energy sources into rotational power to drive a propulsor and because the fuel used is energy dense making the gas turbine engines technically well suited for the task of flying large commercial aircraft in particular.

Sustainable alternative jet fuels (SAJFs) have been developed but are partial blends with fossil fuel, and those SAJFs that derive from or include plant-based fuels will have significant land use issues in volumes sufficient to be impactful. Other leading proposed alternative fuels rely on partial- or all-electric propulsion concepts with components, from energy storage-to-propulsor drive, having energy and power densities that are unsuited for the purpose of powering large aircraft over useful distances in a reasonably foreseeable timeframe.

BRIEF DESCRIPTION

According to an aspect of the disclosure, a propulsion system is provided and includes a solid hydride storage unit from which gaseous hydrogen fuel is drawn, an engine comprising a combustion chamber and a piping system to draw the gaseous hydrogen fuel from the solid hydride storage unit, the piping system being interposed between the solid hydride storage unit and the combustion chamber. The combustion chamber is receptive of the gaseous hydrogen fuel drawn from the solid hydride storage unit by the piping system and is configured to combust the gaseous hydrogen fuel to drive an operation of the engine.

According to additional or alternative embodiments, the engine includes a gas turbine engine.

According to additional or alternative embodiments, the engine generates power to drive a vehicle.

According to additional or alternative embodiments, the gaseous hydrogen fuel is desorbed from the solid hydride storage unit by an application of heat.

According to additional or alternative embodiments, the heat is provided at least in part from the engine.

According to an aspect of the disclosure, a propulsion system is provided and includes an engine including a combustion chamber, a solid fuel storage system including one or more metal hydride compound segments, a heating system operable to apply heat to the one or more metal hydride compound segments to desorb gaseous hydrogen fuel from the one or more metal hydride compound segments and a piping system configured to direct the gaseous hydrogen fuel to the combustion chamber of the engine. The combustion chamber is receptive of the gaseous hydrogen fuel and is configured to combust the gaseous hydrogen fuel to drive an operation of the engine.

According to additional or alternative embodiments, the solid fuel storage system includes canisters in which the one or more metal hydride compound segments are storable and the heating system includes heating elements disposed in the canisters to heat the one or more metal hydride compound segments.

According to additional or alternative embodiments, the solid fuel storage system further includes tubular elements and each canister is loadable and unloadable as a singular unit into and from a corresponding one of the tubular elements.

According to additional or alternative embodiments, each canister includes an outer casing, heating element films supported on an interior surface of the outer casing and perforated heating element films defining a central gas channel. The one or more metal hydride compound segments are radially interposable between the heating element films and the perforated heating element films.

According to additional or alternative embodiments, segment insulators are axially interposable between adjacent ones of the one or more metal hydride compound segments.

According to additional or alternative embodiments, the canisters have varying capacities and the heating system is controllable to selectively heat the one or more metal hydride compound segments in each of the canisters having the varying capacities in accordance with one or more of a predefined schedule and the operation of the engine.

According to additional or alternative embodiments, the piping system includes a starting and idle feed tank.

According to additional or alternative embodiments, an external power source powers operations of at least the heating system and a controller controls at least the operations.

According to additional or alternative embodiments, the propulsion system further includes a fuel cell and the piping system is configured to direct the gaseous hydrogen fuel to the combustion chamber of the engine and the fuel cell.

According to an aspect of the disclosure, an aircraft is provided and includes the propulsion system, the engine includes one or more gas turbine engine and the solid fuel storage system includes one or more of an internal and an external storage unit.

According to an aspect of the disclosure, a method of propulsion is provided and includes storing metal hydride on a vehicle, desorbing hydrogen gas from the metal hydride and combusting the hydrogen gas to generate power for propulsion of the vehicle.

According to additional or alternative embodiments, the storing of the metal hydride includes storing the metal hydride in canisters, loading the canisters in a full state into the vehicle and unloading the canisters in a spent state into the vehicle.

According to additional or alternative embodiments, the desorbing of the hydrogen gas includes heating the metal hydride.

According to additional or alternative embodiments, the method further includes controlling the heating in accordance with an operational state of the vehicle.

According to additional or alternative embodiments, the method further includes drawing power from one or more of an external source, a fuel cell and the combusting of the hydrogen gas to power the desorbing.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 3 is a side view of a canister of the propulsion system of FIG. 2 in accordance with embodiments;

FIG. 4 is a cross-sectional view of the canister of FIG. 3 taken along line 4-4 of FIG. 3;

These and other advantages and features will become more apparent from the following description taken in conjunction with the drawings.

DETAILED DESCRIPTION

As will be described below, a combustion chamber engine system is provided that utilizes a solid hydride of hydrogen as a fuel storage medium that can be safely stored on board a vehicle, such as a large aircraft, to power the vehicle. The solid hydride of hydrogen can generate gaseous hydrogen with the controlled application of moderate heat and this gaseous hydrogen can then be used in the generation of power in a combustion chamber of an engine, such as in a gas turbine engine. This type of system is conceptually simple, includes safely stored aluminum hydride and heating elements that are capable of progressively heating the aluminum hydride to provide the resultant hydrogen gas.

Figure 1:
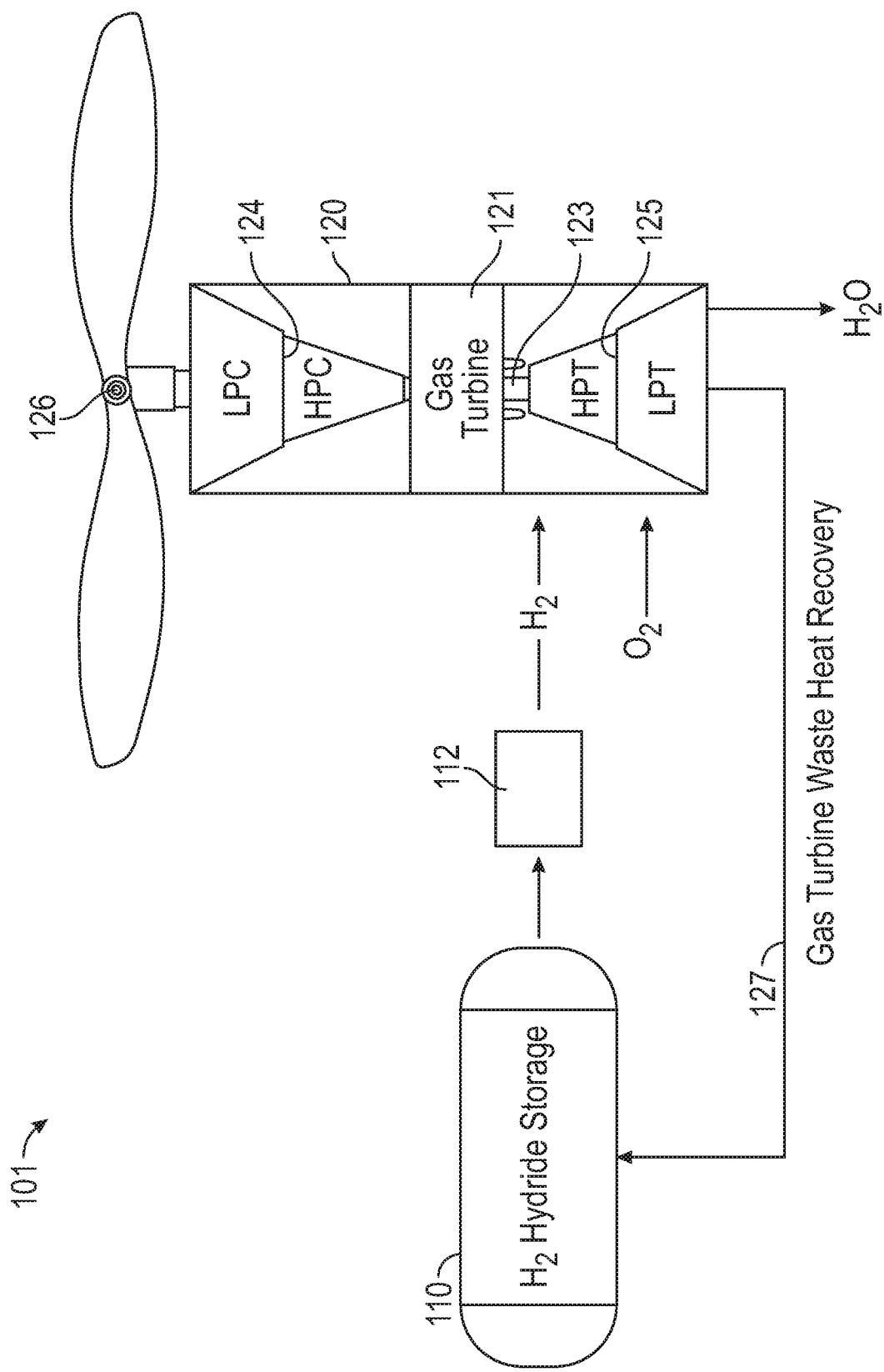
FIG. 1 is a schematic diagram of a propulsion system in accordance with embodiments.

With reference to FIG. 1, a propulsion system 101 is provided and includes solid hydride storage unit 110 in which a solid form of hydrogen is stored in, for example, metal hydride or aluminum hydride form. The propulsion system 101 further includes a system by which the hydrogen is desorbed from the solid form and drawn from the solid hydride storage unit 110 as hydrogen gas ($H_2$) or gaseous hydrogen fuel into an engine 120 via a hydrogen pressure and flow control unit 112. The engine 120 includes a combustion chamber 121, such as a combustion chamber of a gas turbine engine 122. The combustion chamber 121 is receptive of the gaseous hydrogen fuel, which is drawn from the solid hydride storage unit 110, and is configured to combust the gaseous hydrogen fuel to drive an operation of the engine 120 (e.g., a rotation of a rotor 123, high and low pressure compressors 124, high and low pressure turbines 125 and/or a propeller 126). The combustion of the gaseous hydrogen fuel in the combustion chamber 121 can be used to generate sufficient power to drive a vehicle, such as an aircraft. The system by which the hydrogen is desorbed from the solid form can be a heating system and, in some cases, waste heat 127 that is drawn from the engine 120 and applied to the solid form of hydrogen stored in the solid hydride storage unit 110.

With reference to FIGS. 2-5, a propulsion system 201 is provided and includes an engine 210 that includes a combustion chamber 211, a solid fuel storage system 220 that includes one or more metal hydride compound segments 221 (see FIG. 4), a heating system 230 operable to apply heat to the one or more metal hydride compound segments 221 to desorb gaseous hydrogen fuel from the one or more metal hydride compound segments 221 and a piping system 240. The piping system 240 is interposed between the solid fuel storage system 220 and the combustion chamber 211 and is configured to draw the gaseous hydrogen fuel from the solid fuel storage system 220 and to direct the gaseous hydrogen fuel to the combustion chamber 211 of the engine 210. The combustion chamber 211 is thus receptive of the gaseous hydrogen fuel and configured to combust the gaseous hydrogen fuel to drive an operation of the engine 210.

The solid fuel storage system 220 includes canisters 222 (e.g., canisters $222_{1-6}$ in FIG. 2) in which the one or more metal hydride compound segments 221 are storable, tubular elements 223 and conformal access doors 224. Each canister 222 is loadable and unloadable as a single unit into and from a corresponding one of the tubular elements 223 via the corresponding conformal access door 224. The tubular elements 223 can have a cooling capability to maintain the canisters 222 in a predetermined temperature range. The cooling capability can be liquid, air, thermoelectric, etc. The conformal access doors 224 can open and close automatically under certain conditions and can be biased toward closure. The heating system 230 includes heating elements 231 that are disposed in the canisters 222 to heat the one or more metal hydride compound segments 221.

Figure 5:
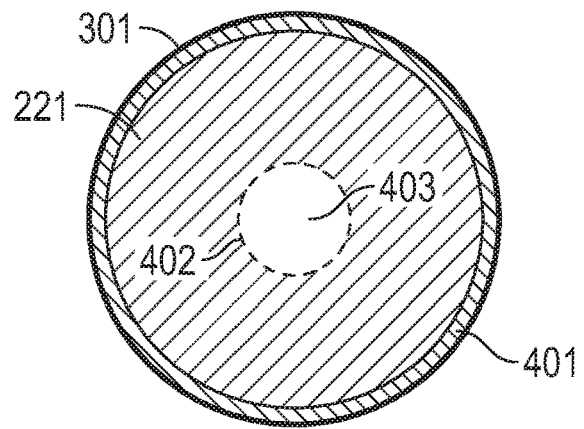
FIG. 5 is an axial view of the canister of FIGS. 3 and 4 taken along line 5-5 of FIG. 4.

In accordance with embodiments, as shown in FIGS. 3-5, each canister 222 includes an outer casing 301 that has a generally cylindrical or elongate shape and a manifold connector 302 that connects to the piping system 240, heating element films 401 and perforated heating element films 402 of the heating system 230. The heating element films 401 are supported on an interior surface of the outer casing 301 and the perforated heating element films 402 are formed to define a central gas channel 403. The one or more metal hydride compound segments 221 are radially interposable between the heating element films 401 and the perforated heating element films 402. Segment insulators 404 are axially interposable between adjacent ones of the one or more metal hydride compound segments 221 to limit unintended heating of metal hydride compound segments 221.

In accordance with embodiments, each of the one or more metal hydride compound segments 221 can include solid passivated aluminum hydride ($AlH_3$) formed into segmented cylinders and in a solid powder form that can be containerized at standard temperature and pressure but which releases hydrogen gas when heated to 150-200° C. In this form, each of the one or more metal hydride compound segments 221 has around twice the hydrogen density of liquid hydrogen per volume and hydrogen gas that evolves from it has around 2.8 times the specific energy of certain jet fuels.

During operations of the propulsion system, the heating element films 401 and the perforated heating element films 402 are activated to apply heat (moderate heat in a range of 150-200° C.) to the one or more metal hydride compound segments 221. This causes gaseous hydrogen to desorb or evolve from the one or more metal hydride compound segments 221 and to flow through the perforated heating element films 402 into the central gas channel 403, a gaseous hydrogen collector adjacent to the manifold connector 302 and through the manifold connector 302 to the piping system 240.

Once the one or more metal hydride compound segments 221 are spent in a given canister 222, the canister 222 can be unloaded as a single unit from the corresponding tubular element 223 via the corresponding conformal access door 224 and can be replaced by a new, full canister 222. The loading and unloading of the canisters 222 into and from the tubular elements 223 can be facilitated by a quick connect system, which can include or be provided as electro-mechanical connecting, latching, locking and sealing systems to enable one-step attachment canisters 222 and associated heating elements and sensor systems.

Figure 2:
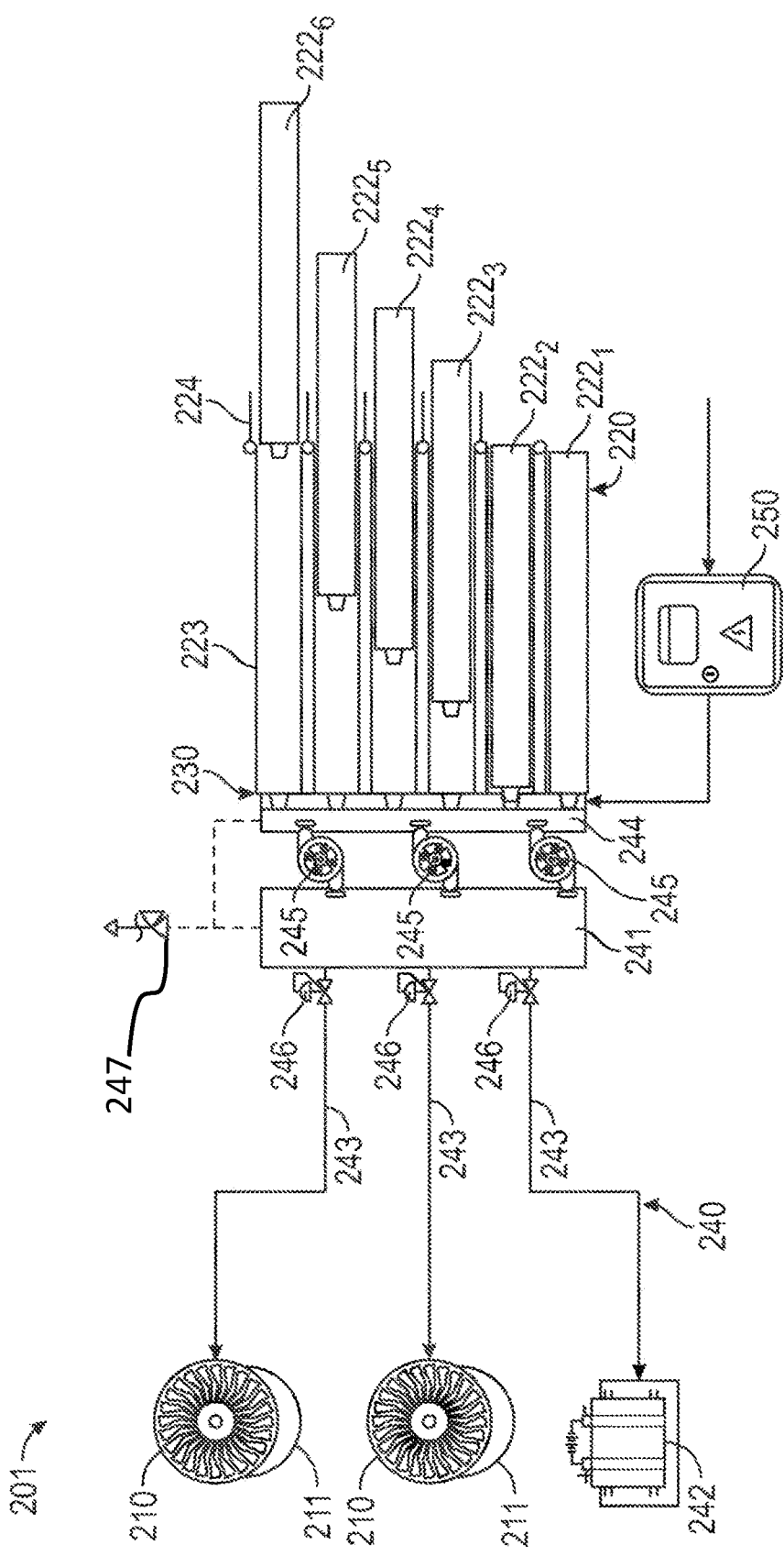
FIG. 2 is a schematic diagram of a propulsion system in accordance with further embodiments.

In accordance with embodiments, as discussed in further detail below with reference to FIGS. 6-9, the canisters 222 can have varying capacities and the heating system 230 can be controllable to selectively heat the one or more metal hydride compound segments 221 in each of the canisters 222 having the varying capacities in accordance with one or more of a predefined schedule and the operation of the engine 210. That is, as shown in FIG. 2, where the engine 210 is provided as one or more engines 210 (e.g., gas turbine engines) for an aircraft, canisters $222_{1-3}$ have a relatively limited capacity but a configuration that facilitates relatively fast hydrogen gas desorption for short duration, high energy operations of the engine 210, such as take-offs, landings and certain flight maneuvers, whereas canisters $222_{4-6}$ have a relatively large capacity and a configuration that facilitates relatively slow hydrogen gas desorption for cruising. In these or other cases, the heating system 230 can be configured to apply heat in a controllable sequence in, for example, the canisters $222_{1-3}$ during the take-off, landing and certain maneuvers and the canisters $222_{4-6}$ during cruising.

The piping system 240 includes a starting and idle feed tank 241, which provides for a pressurized collection point for the gaseous hydrogen fuel for subsequent distribution to the engine(s) 210 and/or an optional fuel cell auxiliary power unit (APU) 242 that is configured to generate electricity from the gaseous hydrogen fuel not directed toward the engine(s) 210, conduits 243 leading from the feed tank 241 to the engine(s) 210 and the optional fuel cell APU 242, a vacuum manifold 244 interposed between the canisters 222 and the feed tank 241, pumps 245 interposed between the vacuum manifold 244 and the feed tank 241 and valves (e.g., PRSOVs) 246 disposed along the conduits 242. The various components of the piping system 240 facilitate and ensure transport and pressurization of the gaseous hydrogen fuel from the canisters 222 into the feed tank 241 and from the feed tank 241 to the engine(s) 210 and the optional fuel cell APU 242. The valves 246 and other vents can be manually or automatically operated and are provided to regulate flow, isolate components, release excess flow or pressure overboard, etc., based on a suite of health monitoring sensors and real-time propulsion system model(s).

The piping system 240 can further include a vent system 247 that allows hydrogen gas to escape to the atmosphere under certain conditions from at least the feed tank 241 and the vacuum manifold 244 as a safety measure. The vent system 247 includes conduits fluidly coupled to the feed tank 241 and the feed manifold 244 as well as one or more valves operably disposed along the conduits to controls fluid flows therein. The one or more valves can be manually or automatically operated.

The propulsion system 201 can further include an external power source and controller 250. The external power source and controller 250 can be disposed and configured to power operations of at least the heating system 230, such as when sufficient electrical energy is unavailable during start-up processes, to control at least the operations of the heating system 230, such as by controlling which heating element films 401 and which perforated heating element films 402 of each of the canisters $222_{1-6}$ are to be activated at any particular time.

Operations of the propulsion system 201 described above will now be described in greater detail.

During starting operations or start-up, power sources, such as grounded power or batteries, apply electricity to the film heating elements 401 and the perforated film heating elements 402 in those canisters 222 that are formed to accommodate and optimize starting. The heating releases hydrogen gas from the solid metal hydride compound segments 221 and this hydrogen gas flows through the central gas channel 403 and into the vacuum manifold 244 where it is pumped into the feed tank 241. When pressures in the feed tank 241 are sufficient, a starting controller sends electric power to the starter/generator (ESG) of the engine(s) 210 to begin core rotations. When core speed is sufficient, gaseous hydrogen fuel flow and ignition is commanded and scheduled to provide torque to accelerate the core to idle speed. Alternatively, ground or battery power could be used to begin generating gaseous hydrogen to then start the optional fuel cell APU 242 which could subsequently provide electric power throughout the remainder of the starting process as required. Film heating progresses radially and axially in the canisters 222 to maintain gaseous hydrogen fuel flow sufficient to meet idle demands.

At a time sufficiently prior to takeoff, a canister 222 is commanded to begin producing hydrogen gas by progressive heating. When sufficient pressure and flow are available, takeoff can begin. As takeoff and climb require a large fraction of total mission energy, design of the canister 222 and the solid metal hydride compound segments 221 for this phase are different than that intended for starting and taxi and cruise. This might also be true for the feed tank 241.

Since cruise power is a fraction of that of takeoff, and cruise total energy will be greater as a function of range and since hydrogen gas generation and feed processing are the same as start-up and takeoff, it may be desirable/optimal for the canisters 222 for cruise operations to be of a different configuration than those for other flight phases to align hydrogen gas evolution parameters with flow requirements (e.g., the cruise canisters 222 might be of thinner diameter and/or longer than for takeoff and start-up).

During descent and landing, minimal energy and power are required for but sufficient hydrogen gas will need to be evolved and available for the short burst of full reverse power during landing. In addition, sufficient fuel reserves are required per rules of varying jurisdictions and it may be desirable to dedicate separate canister(s) 222 for this purpose. Used canisters 222 can be removed from the tubular elements 223 with appropriate ground handling equipment and returned to local recharging stations for removal and recycling of discharged aluminum and for reloading with fresh canisters 222. Subsequent canister 222 built-in tests (BITs) will ensure all required functions are fully operational for next uses.

With reference to FIGS. 6-9, multiple levels and types of fuel or canister controls can be provided to meet various types of fuel requirements during various types of operations. For example, a form factor of each canister 222 can be modified whereby canister cross-sectional areas are made proportional to desired or required fuel flow rates (e.g., to achieve certain available power levels) and/or canister lengths can be made proportional to desired or required fuel flow durations (e.g., to achieve certain available range levels). As other examples, the number and surface areas of perforated heating element films 402 can be varied, longitudinal rates of heating progression and/or heating temperatures along canister lengths can be varied, canister storage capacity can be varied and independent reserve fuel tanks can be segregated.

Figure 6:
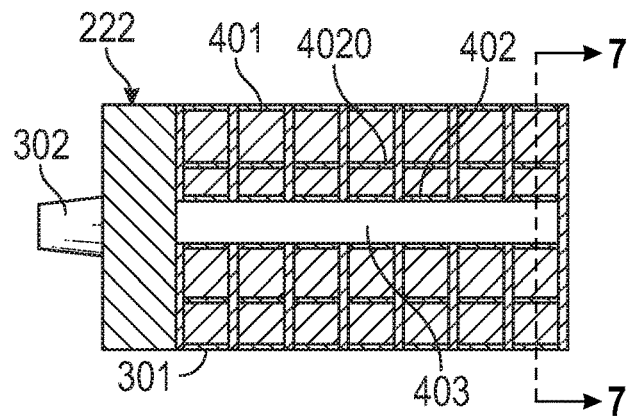
FIG. 6 is a cross-sectional view of a canister in accordance with further embodiments.
Figure 7:
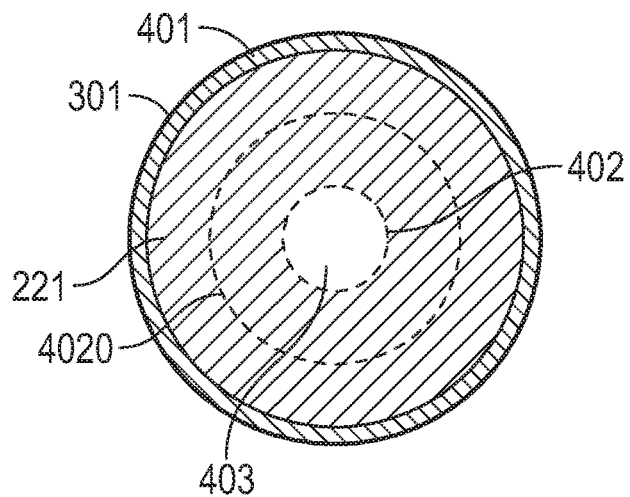
FIG. 7 is an axial view of the canister of FIG. 6 taken along line 7-7 of FIG. 6.

In accordance with further embodiments and, as shown in FIGS. 6 and 7, an additional layer of perforated heating element films 4020 can be provided within one or more metal hydride compound segments 221 in a canister 222 where that canister 222 includes an outer casing 301, heating element films 401 and perforated heating element films 402, which define a central gas channel 403 (of differing or similar diameter to that of the central gas channel 403 of FIG. 5). In this case, the heating element films 401, the perforated heating element films 402 and the additional perforated heating element films 4020 serve to desorb more hydrogen gas from the one or more metal hydride compound segments 221 than would otherwise be possible with just the heating element films 401 and the perforated heating element films 402. Such a canister could provide for increased fuel flow for take-off and landing as well as certain high fuel demand flight operations in an aircraft.

Figure 8:
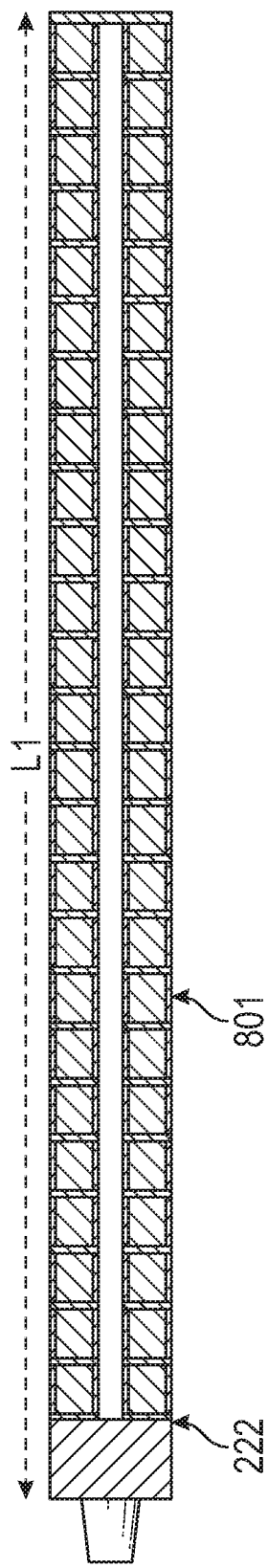
FIG. 8 is a cross-sectional view of a canister in accordance with further embodiments.
Figure 9:
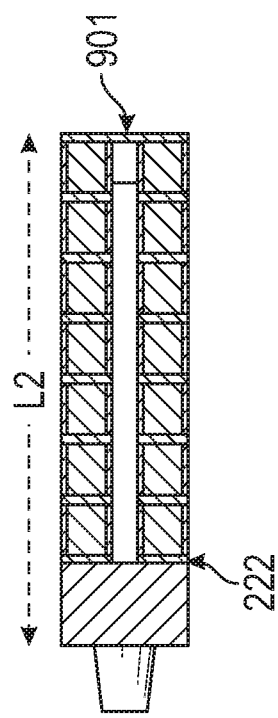
FIG. 9 is a cross-sectional view of a canister in accordance with further embodiments.

As shown in FIGS. 8 and 9, canister 222 can be provided as a cruising canister 801 (see FIG. 8) or a reserve fuel tank canister 901 (see FIG. 9). In the former case, the cruising canister 801 can have a length L1 that provides for a certain quantity of available hydrogen gas over its length that is sufficient to support cruising over long distances. In the latter case, the reserve fuel tank canister 901 has a shorter length L2 that is sufficient to only meet reserve tank requirements without taking up too much space on an aircraft.

Figure 10:
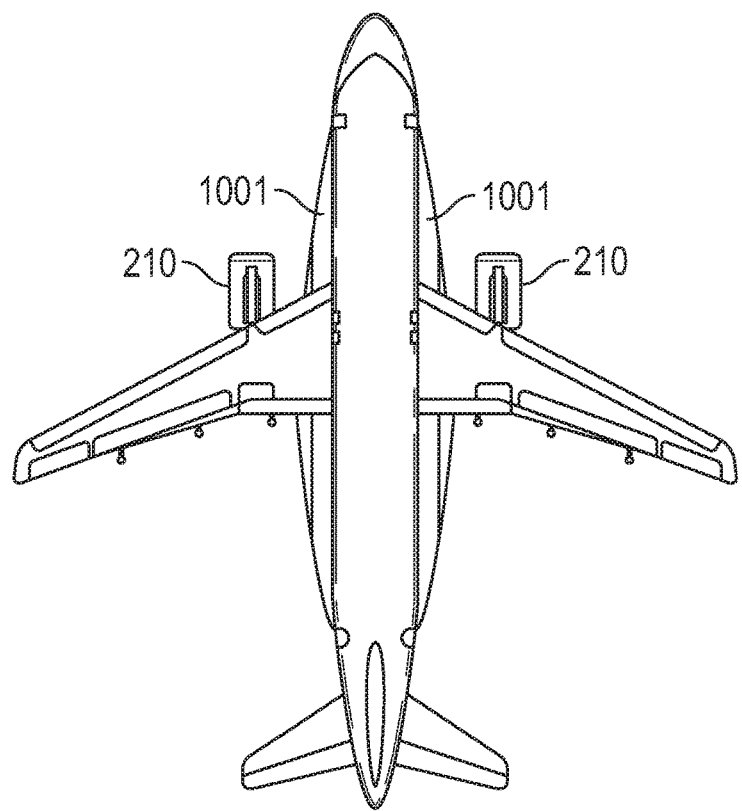
FIG. 10 is a top-down view of an aircraft including internal solid fuel tanks in accordance with embodiments.
Figure 11:
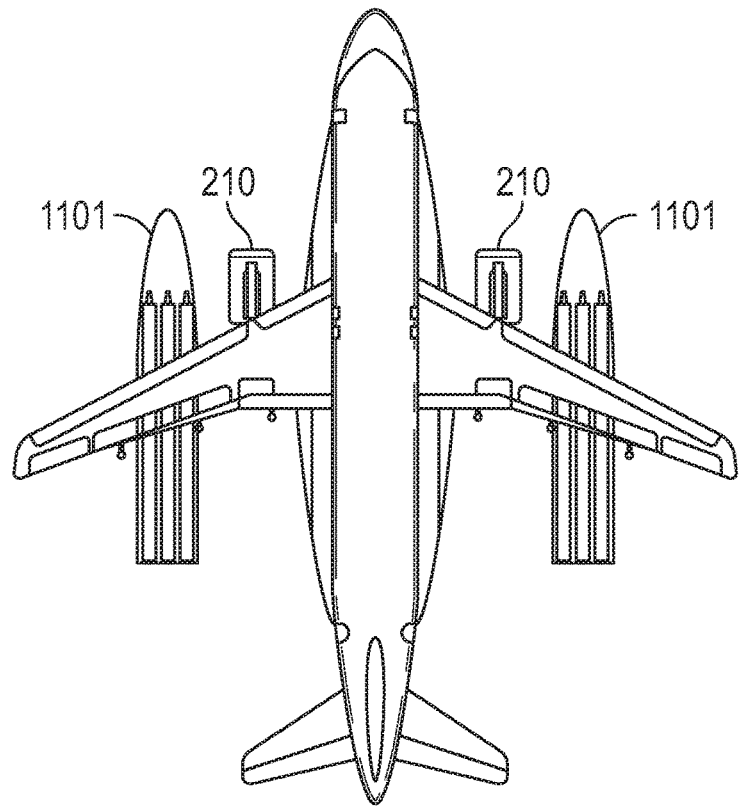
FIG. 11 is a top-down view of an aircraft including external solid fuel tanks in accordance with embodiments.
Figure 12:
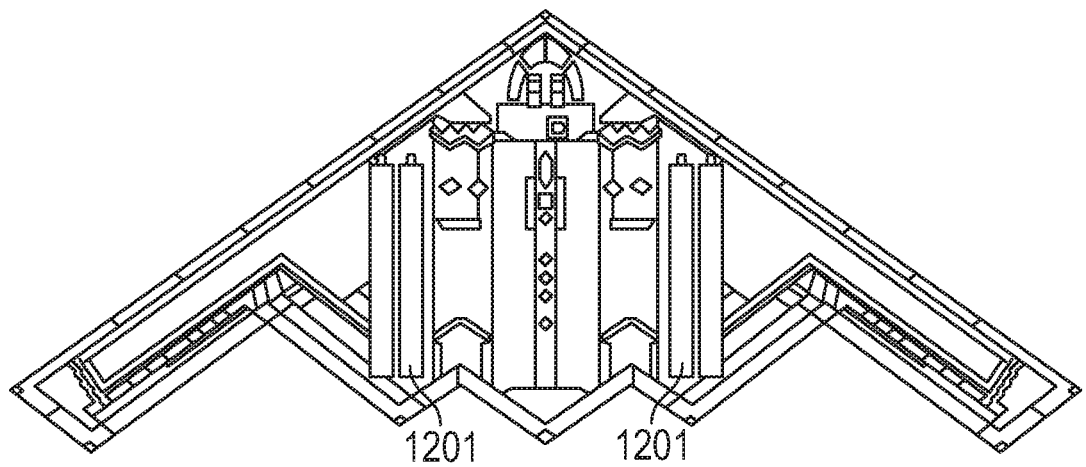
FIG. 12 is a top-down view of a flying wing including internal solid fuel tanks in accordance with embodiments.

With reference to FIGS. 10-12, the propulsion system 201 described above with reference to FIGS. 2-5 and FIGS. 6-9 and the accompanying text can be configured for use in vehicles, such as aircraft and automobiles, and certain static applications, such as power generation plants. In the case of the propulsion system 201 being configured for use in an aircraft with one or more engines 210 (e.g., gas turbine engines) and in accordance with embodiments, the canisters 222 can be stored internally or externally as shown in the internal tanks 1001 of the commercial jet aircraft of FIG. 10, the external tanks 1101 of the commercial jet aircraft of FIG. 11 and the internal tanks 1201 of the flying wing of FIG. 12.

Although the descriptions provided herein refer to the canisters 222 as being generally tubular, it is to be understood that this is not required and that other shapes and configurations are possible. The description of the canisters 222 as being generally tubular is for purposes of clarity and brevity and should not be interpreted as otherwise limiting the scope of the application in any way.

Figure 13:
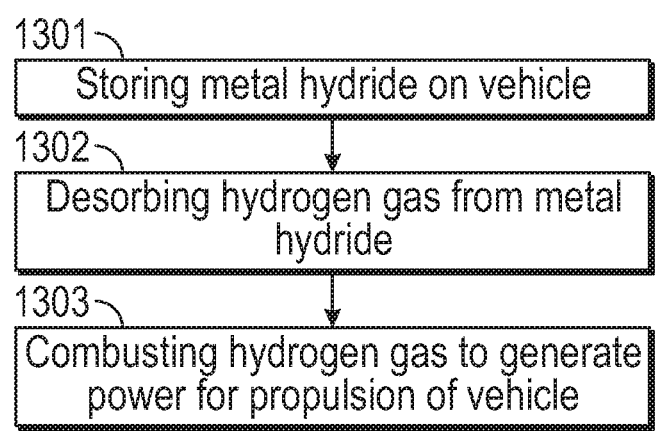
FIG. 13 is a flow diagram illustrating a method of propulsion in accordance with embodiments.

With reference to FIG. 13, a method of propulsion is provided. As shown in FIG. 13, the method includes storing metal hydride on a vehicle (1301), desorbing hydrogen gas from the metal hydride (1302), by, e.g., applying heating thereto, by controlling the heating in accordance with operational states of the vehicle and by drawing power from one or more of an external source, a fuel cell and the combusting of the hydrogen gas to power the desorbing, and combusting the hydrogen gas to generate power for propulsion of the vehicle (1303). As explained above, the storing of the metal hydride of operation 1301 can include storing the metal hydride in canisters, loading the canisters in a full state into the vehicle and unloading the canisters in a spent state into the vehicle.

Technical effects and benefits of the features described herein are the provision of a combustion chamber engine system that does not produce greenhouse gasses and produces no smoke, soot, unburned hydrocarbons or particulate matter emissions. When used in an aircraft, the combustion chamber engine system has minimal contrail production and can be utilized with minimal re-engineering. The fuel for the combustion chamber engine system can be aluminum hydroxide, for example, and can be containerized and equipment refueled easily (e.g., like changing a battery). In operation, the combustion chamber engine system is simple to operate in that gaseous hydrogen is desorbed from solid fuel by the application of heat and left over aluminum is recyclable. The solid fuel is safer to handle than cryogenic liquid hydrogen or high pressure gaseous hydrogen and refuel schemes could be much quicker than liquid refueling (used canisters can be unplugged for regeneration and replacement by new one canisters).

The features described herein are a much more achievable zero-CO2 step than other concepts, especially as an interim step toward pure electric propulsion that achieves global goals for greenhouse emissions elimination without completely disrupting industries, such as the civil aviation industry and particularly the gas turbine industry. The features described herein can represent a transition step toward fully electric propulsion since airliner-class, all-electric propulsion remains decades away. The aircraft fuel concept could also support on board hydrogen generation to power fuel cells to produce electricity.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A propulsion system, comprising:
a solid hydride storage unit comprising canisters in which one or more metal hydride compound segments are stored and from which gaseous hydrogen fuel desorbed from the one or more metal hydride compound segments is drawn, wherein each canister comprises an outer casing, first heating element films, and perforated heating element films, the first heating element films of each canister being supported on an interior surface of the outer casing, the perforated heating element films defining a central gas channel, the one or more metal hydride compound segments being interposed between the first heating element films and the perforated heating element films;
an engine comprising a combustion chamber; and a piping system to draw the gaseous hydrogen fuel from the solid hydride storage unit, the piping system being interposed between the solid hydride storage unit and the combustion chamber, the combustion chamber being receptive of the gaseous hydrogen fuel drawn from the solid hydride storage unit by the piping system and configured to combust the gaseous hydrogen fuel to drive an operation of the engine.

2. The propulsion system according to claim 1, wherein the engine comprises a gas turbine engine.

3. The propulsion system according to claim 1, wherein the engine is configured to generate power to drive a vehicle.

4. The propulsion system according to claim 1, wherein the gaseous hydrogen fuel is desorbed from the one or more metal hydride compound segments by an application of heat.

5. The propulsion system according to claim 4, wherein the heat is provided at least in part from the engine.

6. A propulsion system, comprising:
an engine comprising a combustion chamber;
a solid fuel storage system comprising one or more metal hydride compound segments and canisters in which the one or more metal hydride compound segments are stored;
a heating system operable to apply heat to the one or more metal hydride compound segments to desorb gaseous hydrogen fuel from the one or more metal hydride compound segments, the heating system comprising heating elements disposed in each of the canisters to heat the one or more metal hydride compound segments; and
a piping system configured to direct the gaseous hydrogen fuel to the combustion chamber of the engine,
wherein the combustion chamber is receptive of the gaseous hydrogen fuel and configured to combust the gaseous hydrogen fuel to drive an operation of the engine,
wherein each canister comprises an outer casing, the heating elements comprise first heating element films and perforated heating element films, the first heating element films of each canister being supported on an interior surface of the outer casing, the perforated heating element films of each canister defining a central gas channel, and
wherein each canister is configured such that the one or more metal hydride compound segments are radially interposed between the first heating element films and the perforated heating element films.

7. The propulsion system according to claim 6, wherein: the solid fuel storage system further comprises tubular elements, and each canister is loadable and unloadable as a singular unit into and from a corresponding one of the tubular elements.

8. The propulsion system according to claim 6, further comprising segment insulators axially interposable between adjacent ones of the one or more metal hydride compound segments.

9. The propulsion system according to claim 6, wherein: the canisters have varying capacities, and the heating system is controllable to selectively heat the one or more metal hydride compound segments in each of the canisters having the varying capacities in accordance with one or more of a predefined schedule and the operation of the engine.

10. The propulsion system according to claim 6, wherein the piping system comprises a starting and idle feed tank.

11. The propulsion system according to claim 6, further comprising an external power source to power operations of at least the heating system and a controller to control at least the operations.

12. The propulsion system according to claim 6, further comprising a fuel cell, wherein:
the piping system is configured to direct the gaseous hydrogen fuel to the combustion chamber of the engine and the fuel cell.

13. An aircraft comprising the propulsion system according to claim 6, wherein: the engine comprises one or more gas turbine engines, and the solid fuel storage system comprises one or more of an internal storage unit and an external storage unit.

14. An aircraft, comprising:
an engine comprising a combustion chamber;
a fuel storage system comprising one or more metal hydride compound segments and canisters in which the one or more metal hydride compound segments are stored;
a heating system operable to apply heat to and to desorb gaseous hydrogen fuel from the one or more metal hydride compound segments, the heating system comprising heating elements disposed in each of the canisters to heat the one or more metal hydride compound segments; and
a piping system configured to direct the gaseous hydrogen fuel to the combustion chamber for combustion,
wherein the combustion chamber is receptive of the gaseous hydrogen fuel and configured to combust the gaseous hydrogen fuel to drive an operation of the engine,
wherein each canister comprises an outer casing, the heating elements comprise first heating element films and perforated heating element films, the first heating element films being supported on an interior surface of the outer casing, the perforated heating element films defining a central gas channel, and
wherein each canister is configured such that the one or more metal hydride compound segments are radially interposed between the first heating element films and the perforated heating element films.

15. The aircraft according to claim 14, wherein the fuel storage system is a solid fuel storage system.

16. The aircraft according to claim 14, wherein the canisters are stored in an interior compartment of the aircraft.

17. The aircraft according to claim 14, wherein the piping system comprises a starting and idle feed tank.

* * * * *